Jan. 2, 1962 R. D. BÜGEL ETAL 3,015,759
ELECTROLYTIC WOUND CAPACITOR
Filed June 2, 1958

INVENTORS
Roelof Dirk Bügel
Salomon Boone
BY
AGENT

United States Patent Office 3,015,759
Patented Jan. 2, 1962

3,015,759
ELECTROLYTIC WOUND CAPACITOR
Roelof Dirk Bügel and Salomon Boone, Centuurbaan, Zwolle, Netherlands, assignors to North American Philips Company, Inc., New York, N.Y., a corporation of Delaware
Filed June 2, 1958, Ser. No. 739,155
Claims priority, application Netherlands June 25, 1957
6 Claims. (Cl. 317—230)

Electrolytic wound capacitors are known, more particularly those of small size, in which strip-like electrodes are wound onto a small aluminium rod axially projecting from the roll with the interposition of a spacing material impregnated with electrolyte, the rod having connected to it one strip-like electrode likewise consisting of aluminium.

In known capacitors of the above-mentioned kind, it is common practice for the rod and one end of the electrode strip to be connected thereto either to be welded together on this rod at several points, for example by means of cold welding, or to clamp in position one end of the electrode strip in a longitudinal slit of the rod. The first-mentioned method of connecting has the disadvantage that great forces must be exerted upon the rod, which may result in deformation, which may be disadvantageous more particularly if the rod has a small diameter and hence the turns are bent to a considerable extent. The second method of connecting is more complicated and more expensive as a result of the larger number of operations and the accuracy to be observed, so that there is a greater risk of contamination of the relevant parts, which becomes manifest in a poorer quality of the capacitor.

An object of the invention is to provide a step which permits of avoiding the above-mentioned disadvantages in a simple manner.

According to the invention, an electrolytic wound capacitor of the kind mentioned in the preamble is characterized in that the rod is laterally provided with a flag-like projection which is integral with the rod and the width and thickness of which are equal to those of an electrode strip, either the flag-like projection itself constituting the strip-like electrode connected to the rod, or the electrode strip being mechanically and electrically connected to the flag through the width thereof. The rod with its flag-like projection is preferably obtained by means of impact extrusion. It is alternatively possible to use cold or hot moulding in a suitable matrix.

In order that the invention may be readily carried into effect, it will now be described in detail, by way of example, with reference to the accompanying drawing, in which.

Figure 1:
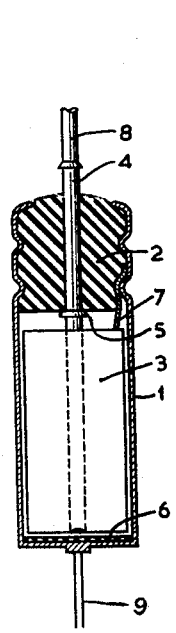
FIG. 1 shows diagrammatically a longitudinal section of an electrolytic wound capacitor of small size.

Referring now to FIG. 1, the capacitor shown comprises an aluminium casing 1, open at one end, which is closed by means of a rubber stopper 2. The casing, which is grooved at the rubber stopper 2, contains a roll 3 impregnated with electrolyte and comprising two aluminium electrode foils wound in the usual manner, together with layers of absorbent paper, on a central anode rod 4. The upper end of the rod 4 axially projects from the roll 3 and extends through the rubber stopper 2. The rubber stopper 2 bears on a flange-like thickened part 5 of the rod 4, the lower end of the roll 3 being separated from the base of the casing 1 by means of a thin insulating disc 6, which may consist of hard paper or polytetrafluorethylene.

One of the electrode strips in the roll 3 is electrically connected to the rod 4 and, like this rod, is provided with a dielectric oxide film. The other electrode strip is connected via a supply strip 7 to the casing 1 due to its end being clamped in position between the rubber stopper 2 and the casing 1.

A current supply wire 8 is welded to the end of the rod 4 projecting from the casing and a current supply wire 9 is welded to the base of the casing 1.

Figure 2:
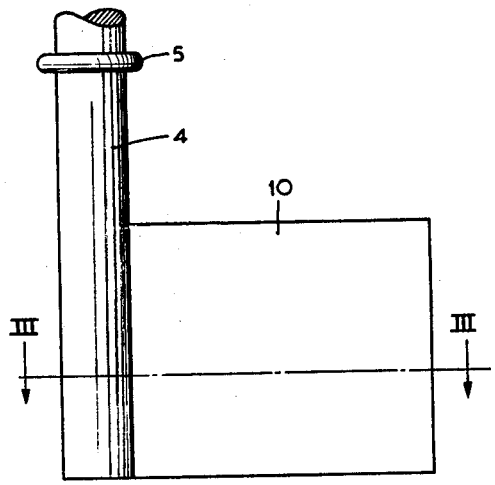
FIG. 2 is an elevation view of the anode of the embodiment of FIG. 1.
Figure 3:
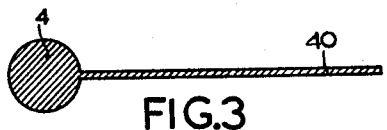
FIG. 3 is a cross-sectional view of the anode of FIG. 2, taken along the line III—III of FIG. 2.

FIGURES 2 and 3 are a side-view and a cross-sectional view, respectively, of the anode rod and of the electrode strip connected thereto in the unrolled state. The electrode strip is constituted by a flag-like projection 10 of the rod 4, that is to say a strip which is integral with this rod. The rod 4 and the strip 10 are formed together in one operation, for example by means of impact extrusion, the flange-like thickened part 5 then being formed at the same time. The rod 4 has a diameter of approximately 1.4 mms. and the projection 10 has a thickness of from 75 to 100 microns. If instead of the strip 10, which is integral with the rod 4, use were made of a separate electrode foil connected to the rod 4 in known manner, then for practical reasons, the diameter of the rod could be chosen not smaller than 2 mms., resulting in a larger size of the roll 3.

Figure 4:
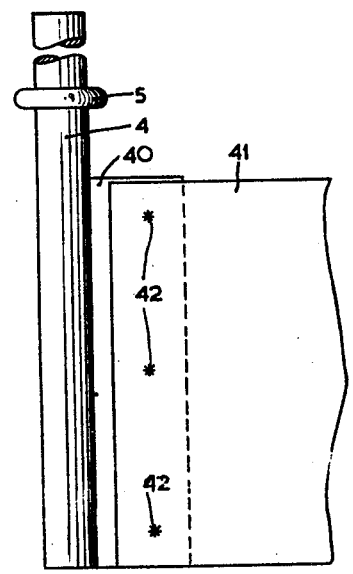
FIG. 4 is an elevation view of another ambodiment of an anode of the type described.

FIG. 4 shows another embodiment of the anode rod 4 and the electrode strip 41 connected thereto in the unrolled state. In this case also, the anode rod 4 has a flag-like projection, indicated by 40, which is integral with the anode rod. However, the electrode foil 41 proper now is a separate aluminium foil which is connected to the flag-like projection 40 at several points 42 by means of cold welding, that is to say the relevant parts are joined together at normal temperature by the use of a locally high pressure. The thickness of the flag-like projection 10 is approximately equal to that of the foil 41, which is in the present case from 75 to 100 microns. The projection 40 is then much shorter than in the previous case and its width, that is to say its dimension in the direction of the length of the rod 4, is equal to, or a little greater, than the width of foil 41.

The described structures have the advantage that handling of the anode rod and the electrode strip connected thereto has been minimized. Contamination of the anode of the capacitor constituted by these parts, which would have a detrimental influence upon the electrolytic capacitor, is thus avoided as far as possible.

The embodiment shown in FIG. 4 has the property that the anode foil 41 is connected to the rod 4 at a surveyable area, whereby deformation of the rod no longer occurs.

The embodiment shown in FIGURES 2 and 3 has the property that a separate connection between the anode foil proper and the anode rod is not required at all. However, this embodiment is not particularly suitable if the desired length of the anode foil and hence the length of the flag-like strip 10 causes difficulty during extrusion or moulding.

What is claimed is:

1. In an electrolytic wound capacitor wherein at least two strip-like electrodes and interposed spacing material impregnated with electrolyte are concentrically wound about a discrete axial rod mechanically connected with at least one of said electrodes; the improvement characterized by a continuous rod and at least one electrode strip.

2. An electrolytic wound capacitor according to claim 1 wherein said continuous rod and electrode is covered with a continuous dielectric oxide film.

3. In an electrolytic wound capacitor wherein at least two strip-like electrodes and interposed spacing material impregnated with electrolyte are concentrically wound about a discrete axial rod mechanically connected with at least one of said electrodes; the improvement characterized by a rod and at least one electrode strip of uninterrupted continuity, and having a covering surface of dielectric material.

4. In an electrolytic wound capacitor wherein at least two strip-like electrodes and interposed spacing material impregnated with electrolyte are concentrically wound about a discrete axial rod mechanically connected with at least one of said electrodes; the improvement characterized by a continuous rod and flag-like projection, said flag-like projection mechanically connected with at least one of said electrodes whereby said rod and associated electrode are electrically interconnected and mechanically unconnected.

5. In an electrolytic wound capacitor according to claim 4 wherein said continuous rod and flag-like projection are covered with a dielectric oxide film.

6. In an electrolytic wound capacitor wherein at least two strip-like electrodes and interposed spacing material impregnated with electrolyte are concentrically wound about a discrete axial rod mechanically connected with at least one of said electrodes; the improvement characterized by a continuous rod and flag-like projection, said flag-like projection mechanically connected with at least one of said electrodes whereby said rod and associated electrode are electrically interconnected and mechanically unconnected, the continuous rod and flag-like projection being covered with a dielectric oxide film, and said rod portion having an annual flange portion spaced concentrically with said rod and spaced apart from said flag-like projection.

References Cited in the file of this patent

UNITED STATES PATENTS

| | | |
|---|---|---|
| 1,190,886 | Giles | July 11, 1916 |
| 2,022,500 | Clark | Nov. 26, 1935 |
| 2,049,691 | Danziger | Aug. 4, 1936 |
| 2,220,887 | Claassen | Nov. 12, 1940 |
| 2,224,150 | Fruth | Dec. 10, 1940 |
| 2,225,801 | Schnoll | Dec. 24, 1940 |
| 2,444,914 | Brennan | July 13, 1948 |